US011067985B2

(12) United States Patent
Kozloski et al.

(10) Patent No.: US 11,067,985 B2
(45) Date of Patent: Jul. 20, 2021

(54) ALTERATIONS IN SELF-DRIVING VEHICLE BEHAVIOR BASED ON PASSENGER TIME NEEDS AND CALENDAR

(71) Applicant: International Business Machines Corporation, Armonk, NY (US)

(72) Inventors: James R. Kozloski, New Fairfield, CT (US); Clifford A. Pickover, Yorktown Heights, NY (US); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/183,423

(22) Filed: Nov. 7, 2018

(65) Prior Publication Data
US 2020/0142407 A1    May 7, 2020

(51) Int. Cl.
*G05D 1/00*    (2006.01)
*G05D 1/02*    (2020.01)
(Continued)

(52) U.S. Cl.
CPC ....... *G05D 1/0088* (2013.01); *G01C 21/3484* (2013.01); *G01C 21/3492* (2013.01);
(Continued)

(58) Field of Classification Search
CPC .. G05D 1/0088; G05D 1/0217; G05D 1/0223; G01C 21/3484; G01C 21/3492; G06K 9/00845; G06Q 10/1093
See application file for complete search history.

(56) References Cited

U.S. PATENT DOCUMENTS

2015/0249906 A1    9/2015  Thomas et al.
2016/0025503 A1*   1/2016  Kees ............... G08G 1/143
                                                  701/400
(Continued)

OTHER PUBLICATIONS

Zhang et al., "Model Predictive Control of Autonomous Mobility-on-Demand Systems", arXiv:1509.03985, https://arxiv.org/pdf/1509.03985.pdf, Feb. 16, 2016, 11 pages.

(Continued)

*Primary Examiner* — Navid Ziaeianmehdizadeh
*Assistant Examiner* — Sean P Quinn
(74) *Attorney, Agent, or Firm* — Scully, Scott, Murphy & Presser, P.C.; Vazken A. Alexanian

(57) ABSTRACT

Method, system, and computer product for operating a self-driving vehicle (SDV). The SDV receives information from a calendar entry of a passenger's schedule about an event at a destination location to which the SDV is to drive the passenger to. The SDV sensors detect one or more behaviors or cognitive states of the passenger while in the vehicle. The SDV determines an optimal arrival time at the destination location based on the user's schedule information and the user's behavior or cognitive state; and further alters the driving speed or route taken by the SDV based on the determined optimal arrival time and an estimated travel time. The reshaping of the SDV driving characteristics is based on calendar information received including: an event meeting time, event topic, attendees, event importance. A detected passenger behavior can include talking on a phone, reading, or being in a tired, sleeping, agitated or nervous state.

20 Claims, 9 Drawing Sheets

(51) Int. Cl.
*G06Q 10/10* (2012.01)
*G01C 21/34* (2006.01)
*G06K 9/00* (2006.01)

(52) U.S. Cl.
CPC ......... *G05D 1/0217* (2013.01); *G05D 1/0223* (2013.01); *G06K 9/00845* (2013.01); *G06Q 10/1093* (2013.01)

(56) References Cited

U.S. PATENT DOCUMENTS

| | | | |
|---|---|---|---|
| 2016/0209220 A1 | 7/2016 | Laetz | |
| 2017/0008523 A1* | 1/2017 | Christensen | G05D 1/0278 |
| 2017/0267256 A1* | 9/2017 | Minster | B60W 50/082 |
| 2018/0135989 A1* | 5/2018 | Schreier | H04W 4/44 |
| 2019/0041228 A1* | 2/2019 | Singhal | B60W 40/08 |
| 2019/0346275 A1* | 11/2019 | Kelly | G06Q 10/047 |

OTHER PUBLICATIONS

Kim et al. "Parallel Scheduling for Cyber-Physical Systems: Analysis and Case Study on a Self-Driving Car", CCPS'13, Apr. 8-11, 2013, Philadelphia, PA, http://www.junsung.kim/paper/iccps13.pdf, pp. 31-40.

Anonymous, "Method and process to use driver habits to train autonomous vehicles", IP.com, IPCOM000230137D, Aug. 21, 2013, pp. 1-2.

Anonymous, "Method for Detecting if a Self Drive Car is in Self Driving Mode", IP.com, IPCOM000235926D, Mar. 31, 2014, pp. 1-2.

Anonymous, "Prioritisation of self-driving vehciles ", IP.com, IPCOM000236869D, May 20, 2014, pp. 1-3.

"Nissan IDS Concept: Nissan's vision for the future of EVs and autonomous driving", NISSAN Press Release, https://nissannews.com/en-US/nissan/usa/releases/nissan-ids-concept-nissan-s-vision-for-the-future-of-evs-and-autonomous-driving, Oct. 27, 2015, 6 pages.

Vassev, "Autonomy Requirements for Smart Vehicles", Lero, http://www.vehits.org/Documents/Previous_Invited_Speakers/2017/VEHITS2017_Vassev.pdf, Apr. 24, 2017, 33 pages.

"Competing for the connected customer—perspectives on the opportunities created by car connectivity and automation", Advanced Industries, Sep. 2015, https://www.mckinsey.com/~/media/mckinsey/industries/automotive%20and%20assembly/ourY020insights/how%20carmakers%20can%20compete%20for%20the%20connected%20consumer/competing_for_the_connected_customer.ashx, 46 pages.

* cited by examiner

ALTERATIONS IN SELF-DRIVING VEHICLE BEHAVIOR BASED ON PASSENGER TIME NEEDS AND CALENDAR

FIELD

The present disclosure relates to a technique for operating a self-driving vehicle (SDV), and more particularly, to a method, system and computer product for adapting an SDV's arrival time to a destination based on user's calendar information and/real-time or current activities.

BACKGROUND

Self-driving vehicles (SDVs), e.g., autonomous cars, can maneuver themselves without human interaction. The autonomous car includes a plurality of sensors that are capable of sensing its environment and navigating without much or no human input.

Autonomous cars combine a variety of techniques to perceive their surroundings, including radar, laser light, GPS, odometry, and computer vision. Advanced control systems interpret sensory information to identify appropriate navigation paths, as well as obstacles and relevant signage.

When a computer of an autonomous car takes over the driving responsibilities, passengers (e.g., drivers) can be provided with additional found time do other things, such as reading or work related activities, all without having to worry about road safety.

SUMMARY

In an aspect of the present disclosure, a computer system and method is implemented in an autonomous (SDV) for scheduling passenger arrival times at a destination contingent upon 1) a passenger's calendar, and 2) a passenger's current activity or behavior.

In an aspect, the system and method for an SDV automatically modifies an SDV's speed, route, and driving behavior based on inputs from 1) a passenger's calendar, and 2) a passenger's current behavior and cognitive state, in a manner such that arrival times for drop off are scheduled to occur are scheduled when a passenger's calendar demands it (for a meeting for example), when a passenger is ready to be discharged (for example, when passenger is "off" the phone), and when traffic and parking are optimally ready for the discharge.

In an aspect of the present disclosure, there is provided a computer-implemented method for operating a self-driving vehicle (SDV). The method comprises: receiving, at a processor of a computer system at the SDV, information from a calendar entry of a passenger's schedule; detecting, using one or more sensors, one or more behaviors of the passenger in the SDV; estimating, using the processor, a travel time for the SDV and passenger to arrive at a destination location associated with the calendar information; determining, using the processor, an optimal arrival time to a destination location based on the user's schedule information and the user's behavior; and altering, using the processor, a driving characteristic of the SDV based on the determined optimal arrival time and the estimated travel time.

In a further aspect of the present disclosure, there is provided a computer system for operating a self-driving vehicle (SDV). The computer-implemented system comprises: one or more sensor devices for monitoring a behavior of said passenger in said SDV; a memory storage device; and a processor of a computer system at said SDV coupled to said memory storage device and configured to perform a method to: receive information from a calendar entry of a passenger's schedule; detect from said one or more sensors, one or more behaviors of said passenger in said SDV; estimate a travel time for said SDV and passenger to arrive at a destination location associated with said calendar information; determine an optimal arrival time to a destination location based on the user's schedule information and the user's behavior; and alter a driving characteristic of the SDV based on the determined optimal arrival time and the estimated travel time.

In an aspect of the present disclosure, a computer program product comprising a computer readable storage medium having computer readable program instructions embodied therewith is provided. The computer readable program instructions are executable by at least one processor to cause a computer to perform the method above.

DETAILED DESCRIPTION

Embodiments of the present disclosure will now be described in detail with reference to the drawings. However, the following embodiments do not restrict the invention claimed in the claims. Moreover, all combinations of features described in the embodiments are not necessarily mandatory for the architecture of the present invention Like numbers are assigned to like elements throughout the description of the embodiments of the present invention.

According to exemplary embodiments of the present disclosure, a method, system, and computer product for inferring or modifying a route or schedule of an autonomous vehicle based on a need(s) of a passenger in the SDV. For example, based on the passenger's calendar, and the passenger's current behavior and cognitive state, an SDV's driving behavior, such as the vehicle's speed, route and/or direction, and arrival time is altered. For the case where multiple passengers being driven by the SDV, the SDV's driving behavior may be modified based on more than one passengers' behavior or cognitive state.

Figure 1:
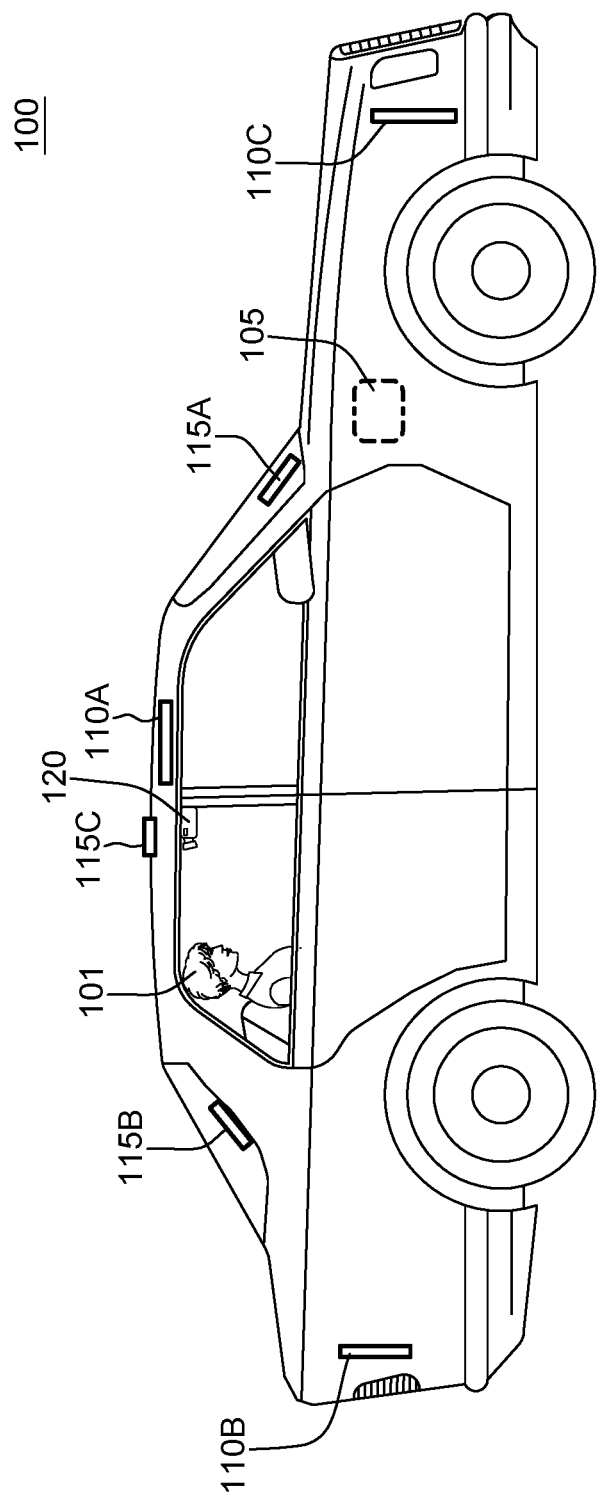
FIG. 1 schematically depicts functional units operating of a SDV for carrying out methods for modifying route and scheduling of the SDV in one embodiment.

FIG. 1 conceptually depicts an SDV 100 and related components for carrying out methods for modifying driving characteristics of the SDV based on a schedule and/or current behavioral or cognitive state of a passenger 101 in one embodiment.

In FIG. 1, SDV 100 is depicted as including functional units including perception sensors 110A, 110B, 110C, for the detecting/sensing of road conditions such as obstacles, real-time traffic conditions such as detours, traffic delays, collisions, etc. The perception sensors may include radar sensors, optical systems such as night vision detectors, ultrasonic sensors, CMOS image sensors, and high-powered cameras 115A, 115B, 115C, e.g., for identifying road markings and traffic signals and can provide 360° vision for the SDV computer system 105 that can process images to determine depth of field, peripheral movement and detect nearby objects and their dimensions. In an embodiment, the SDV may include a LIDAR (Laser Illuminating Detection and Ranging) unit that can provide highly accurate long range detection of objects by building a 3-D omni-directional view to allow the SDV's computing system 105 to identify potential hazards using a laser beam that bounces off of surfaces surrounding the car in order to accurately determine the identity and distance of the object or hazard. Further, there may be included a Global Positioning Software (GPS) system for car navigation, including receiving of start points and end points for SDV travel. The GPS operates in conjunction with radars, sensors, LIDAR and mapping software, run at the computer system, to navigate and maneuver the SDV to a final destination.

The SDV computer system 105 generally including built-in computing and storage for live data processing, including running of sophisticated algorithms for analyzing of data from the various sensors, and additional functionality to assess the vehicle's environment including current vehicle travel and traffic conditions. The SDV may implement an odometry system for receiving data from sensors for the computer to estimate changes in position over time.

Further basic components of the SDV include engine, steering and braking systems (not shown) that include motor actuators powered by electrical power and computer electronics, signal communications systems that enable communications among the computer(s), sensors, hydraulic and pneumatic actuators, etc. for providing autonomous vehicle functionality including SDV motion control and SDV steering control.

The SDV further is provisioned with additional passenger monitoring sensors 120, e.g., video camera, audio sensors, and the like, for monitoring the passenger's current (real-time) physical and behavioral state which can be used to alter the SDV route in a manner most optimal for the passenger given the passenger's calendar parameters, and the current behavioral and cognitive state of the passenger, as detected by sensors 120. For example, it may be real-time sensed using sensors/detectors 120 that the passenger is currently on his/her mobile phone, or whether the passenger has an umbrella or is agitated due to being late for a meeting.

Figure 2:
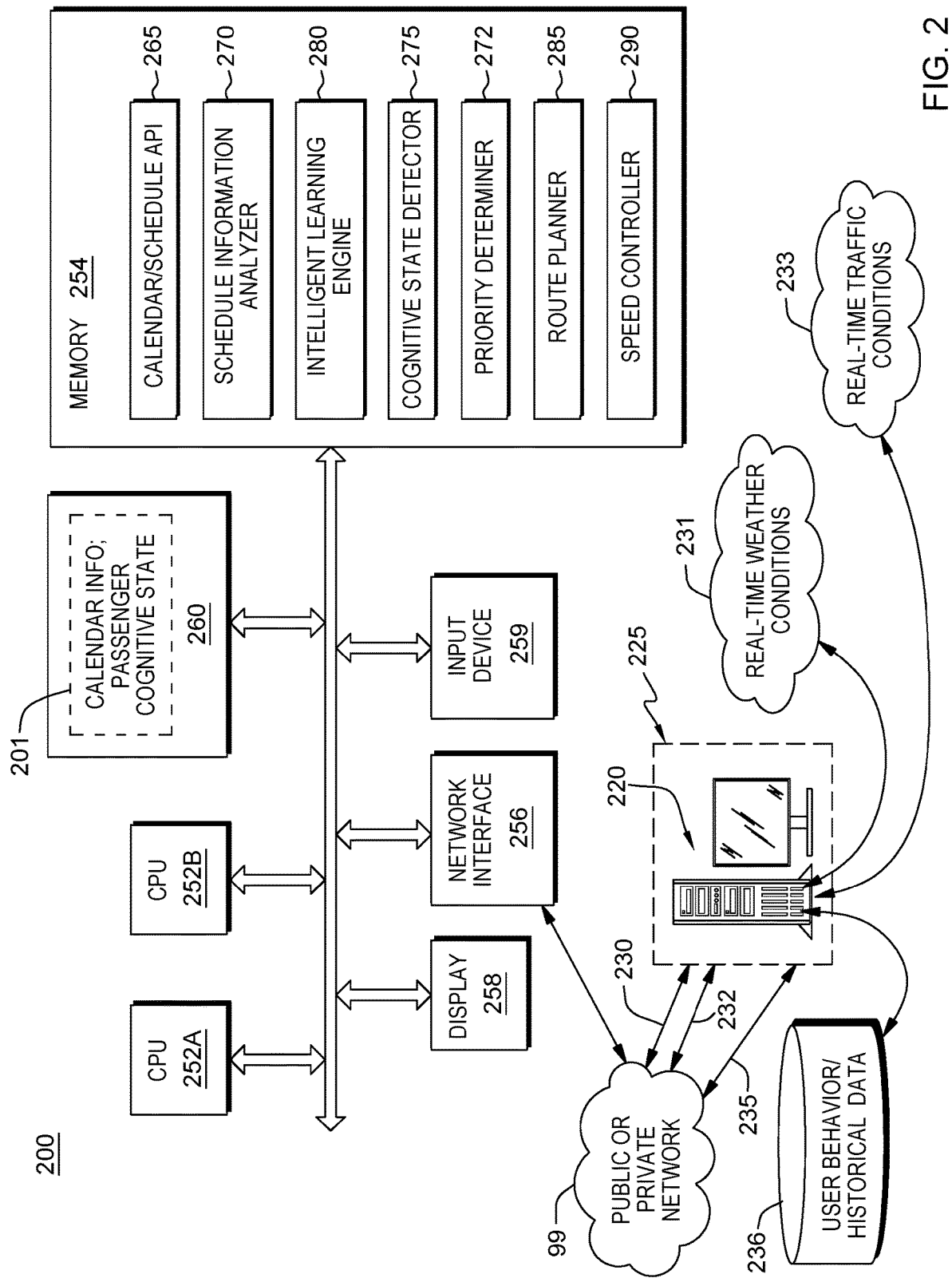
FIG. 2 depicts a computer system providing the ability for automatically modifying an SDV's route or navigation in accordance with a cognitive state of a passenger and that passenger's schedule according to one embodiment.

FIG. 2 depicts a computer system 200 providing the ability for automatically modifying an SDV's behavior, e.g., changing a route, in accordance with a behavioral/cognitive state of a passenger and that passenger's schedule according to one embodiment. In some aspects, system 200 includes a computing device, a mobile device, or a server that includes one or more hardware processors 252A, 252B, a memory 254, e.g., for storing an operating system and program instructions, a network interface 256, a display device 258, an input device 259, and any other features common to a computing device. In an embodiment, the computer system 200 is embodied in a controller on-board the SDV for controlling SDV operations.

In some aspects, computing system 200 may, for example, be any computing device that is configured to communicate with a web-site 225, e.g., embodied as a web- or cloud-based server 220 over a public or private communications network 99. For example, computing system 200 is shown interfacing with a computer hosted web-site 225 including a server 220 in operative communication with a public networked system 231 (such as the National Weather Service) or like weather service portal that provides a RSS or XML current data feed 230 of current real-time monitored weather conditions at a location where the SDV is currently navigating and/or is destined to travel. Server 220 may further communicate with a public networked system or portal (not shown) operated by a municipality's department of transportation traffic management center 233 that provides a real-time traffic condition data feed 232 for a location where the SDV is currently navigating and/or is destined to travel.

Further, in accordance with embodiments herein, as shown as part of system 200, data such as a user's schedule, and particularly, a user's personal calendar information 235, is accessible by computer system 200. For example, an application program interface (API) running on computer system 200 is configurable to access calendar information such as a passenger's events from a particular domain, e.g., an Outlook® (registered trademark of Microsoft, Inc.) web-based e-mail/calendaring account associated with the passenger. For example, an API can be run at computer system 200 to find meeting times for the passenger from that passenger's e-mail program or Outlook® calendar program. As an example, the calendar API at computer system 200 can access meeting times for the passenger, including, but not limited to, other information such as: scheduled meeting attendees, any resources for the meeting, attendee availability, and any time and/or location constraint parameters associated with the meeting, start time, end time, and/or proposed length of meeting, etc.

Further, as shown as part of system 200, data and information such as a passenger's current calendar information 201 and/or historic behavior data for multiple passengers that can be used and analyzed by the SDV in modifying SDV behavior may be stored locally in a memory storage device 260, e.g., an attached memory, or stored in a remote memory storage device 236, e.g., a database, and accessed via a remote network connection for input to the system 200.

In the embodiment depicted in FIG. 2, processors 252A, 252B may include, for example, a microcontroller, Field Programmable Gate Array (FPGA), or any other processor that is configured to perform various operations. Additionally shown are the communication channels 240, e.g., wired connections such as data bus lines, address bus lines, Input/Output (I/O) data lines, etc., for routing signals between the various components of system 200. Processors 252A, 252B may be configured to execute method instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 254 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from the server 220.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 258 may include a liquid crystal display (LCD), an e-paper/e-ink display, an organic LED (OLED) display, or other similar display technologies. In some aspects, display 258 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

With respect to the ability of computer system 200 for modifying a self-driving vehicle behavior, the local or remote memory may be configured to store one or more user's calendar information, current behavioral and/or historical calendar and/or historical behavioral information that, in embodiments herein, are continually analyzed and used to modify a route of an autonomous vehicle. The current behavioral and/or historical behavioral information (or portions thereof) may alternately be stored in on-board memory 260 local to the computer system 200, or otherwise, embodied in the database 236 associated with the remote server 220, over the network.

As mentioned, memory 254 of computer system 200 further stores processing modules that include programmed instructions adapted to invoke operations for analyzing a passenger's calendar information, current behavioral information and/or historical calendar and/or historical behavioral information for use in automatically modifying a route of a SDV carrying the passenger.

In one embodiment, one of the programmed processing modules stored at the associated memory 254 include a calendar API 265 providing instructions that, when run by a processor, configures the system to obtain the passenger's current schedule information, such as that passenger's personal calendar entered via a calendar program, e.g., Outlook®, Apple Calendar, Google Calendar, e.g., by accessing a remote computer system, or that passenger's mobile device or smart phone. For example, some of the passenger's calendar information may be directly accessed, with permission, from the passenger's smartphone.

A further programmed processing module includes an analyzer 270 providing instructions that, when run by a processor, configures the system to analyze and interpret calendar entries, e.g., events, in the passenger's calendar program. Based on the analysis conducted, the computer system determines from the calendar entry whether to modify the SDV route and/or SDV speed to alter the arrival time of the passengers currently in the vehicle at a destination. In an embodiment, based on the information obtained, the electronic calendar can be used to automatically summon an SDV for one or more passengers to pick them up based on a calendar entry, where the pickup time may be based on parameters such as the meeting time, traffic, weather, etc.

A further programmed processing module includes a priority determiner module 272 providing instructions that, when run by a processor, configures the system to assign a priority to the scheduled event that the one or multiple passengers are currently en route to attend, and/or receive a priority designation from a user concerning the scheduled event that the passenger is currently en route to attend. Based on the event priority, the computer system can determine in conjunction with the calendar entry, whether to modify the SDV route and/or SDV speed to alter the arrival time of the passenger currently in the vehicle at a destination.

A further programmed processing module includes a cognitive state detector module 275 providing instructions that, when run by a processor, configures the system to obtain current cognitive state or behavior information from the passenger. For example, this processor may invoke operations to detect or sense the current physical state of the passenger(s), e.g., being tired, sleeping, perspiring, nervous, agitated, reading, being engaged in an audio book or movie on the passenger's smartphone or being presented by the vehicle itself (e.g., presented through the car's audio system or display screen), talking on a phone, eating a meal, etc.

Generally, a cognitive state can be any function of measures of a passenger's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In an example embodiment, certain feature extraction techniques are used for identifying certain cognitive and emotional traits.

A further programmed processing module includes an intelligent learning engine module 280 providing instructions that, when run by a processor, configures the system to "learn" about the typical lateness of the user/passenger and/or other attendees at past scheduled calendar meetings and adjust the arrival time accordingly. Such an intelligent learning support engine module 280 can take advantage of previous route planning experiences and collect route "cost" data in order to build a knowledge base that is used to provide better heuristics for future analysis of electronic calendars, meetings, destinations, cognitive states, and routes. In other words, if attendees are usually 10 minutes late, then the passenger in the SDV needn't arrive on time.

A further programmed processing module includes a route planner module 285 providing instructions that, when run by a processor, configures the system to generate, from the obtained current monitored information including the calendar information, the current passenger behavior information and/or the passenger's cognitive state information, a route modification to a current route being taken by the SDV. Similarly, a programmed processing module includes a speed controller module 290 providing instructions that, when run by a processor, configures the system to generate, from the obtained current monitored information including the calendar information, the current passenger behavior information and/or the passenger's cognitive state information, a modification of the current speed of the SDV. The route planning and speed controller modules may run decision tree logic models or algorithms to detect, based on current passenger cognitive behavior and traffic conditions, a navigable speed and route to ensure satisfying the arrival criteria at the event indicated in the calendar entry.

Figure 3A:
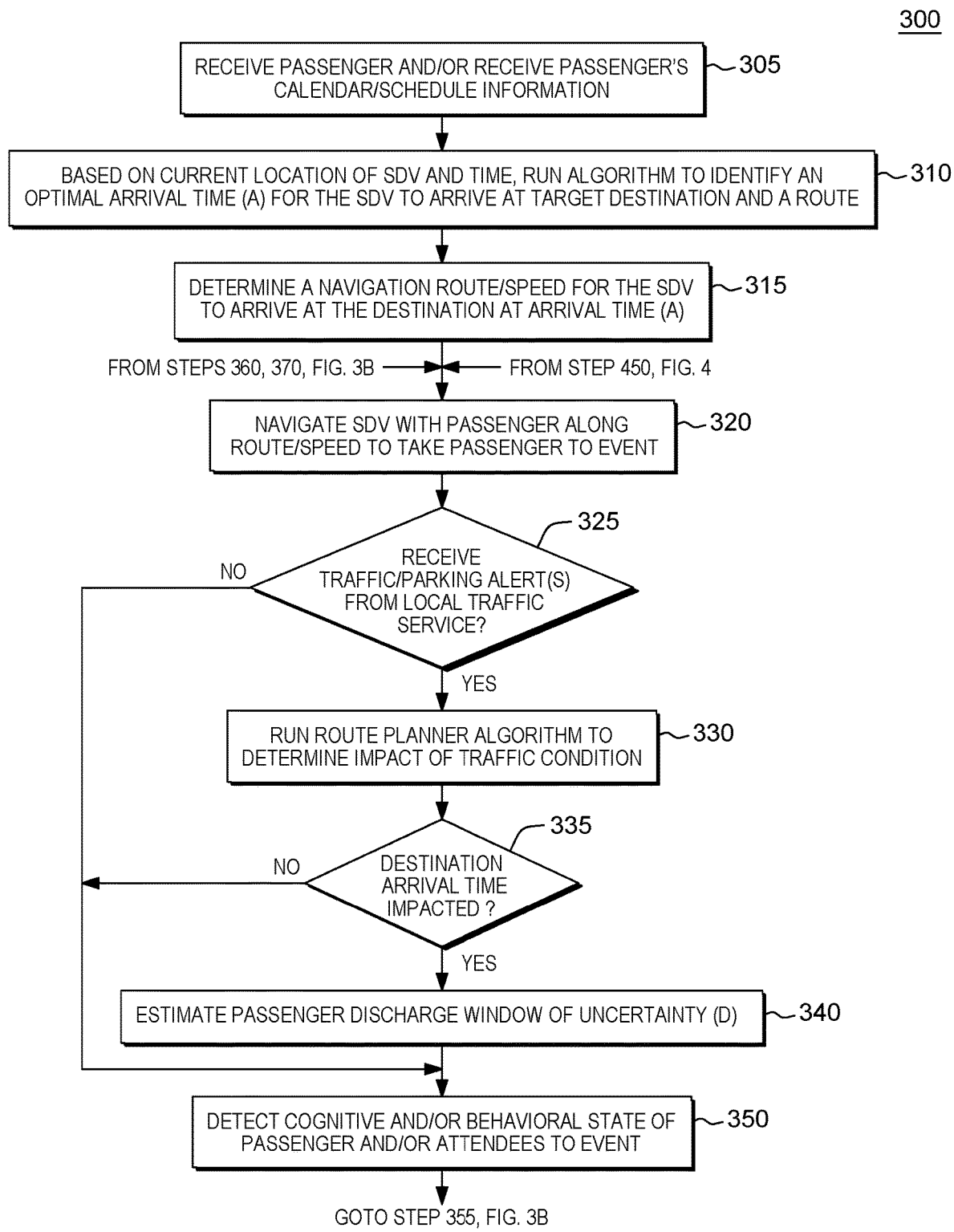
FIGS. 3A-3B depict method steps implemented by the SDV for modifying driving characteristics of the SDV based on a schedule and/or current behavioral or cognitive state of a passenger in one embodiment.
Figure 3B:
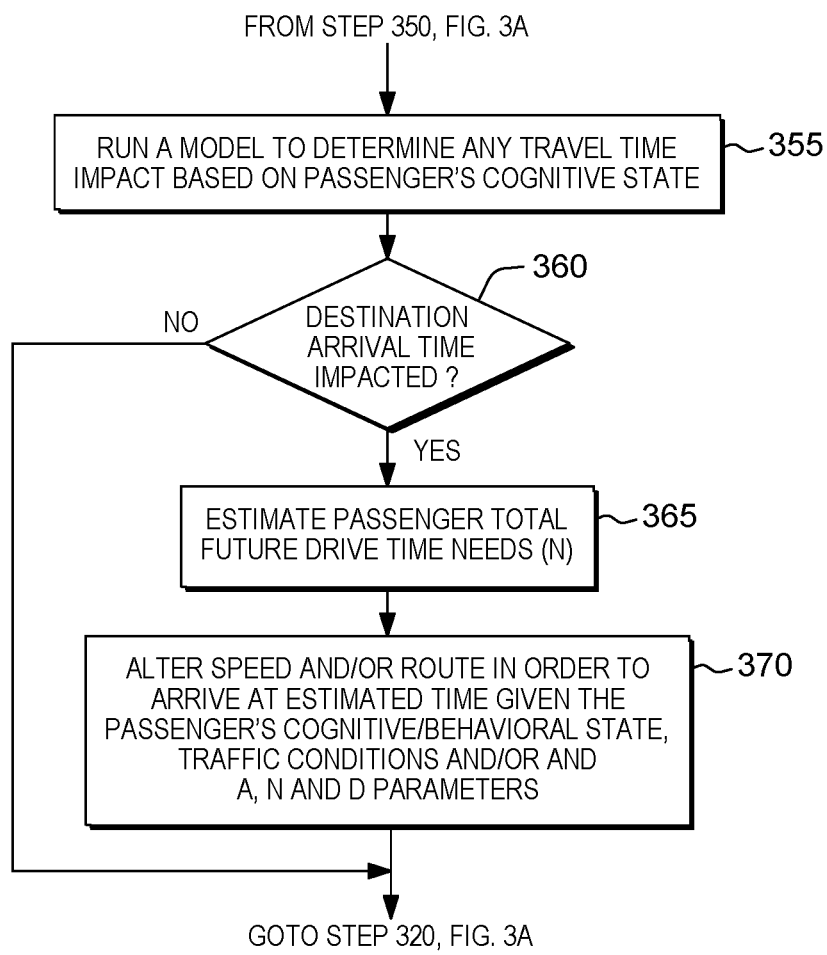

FIGS. 3A-3B conceptually depict a flow chart depicting a method 300 implemented by the SDV decision tree logic model for modifying driving characteristics of the SDV based on a schedule and/or current behavioral or cognitive state of one or more passengers in one embodiment.

A first step 305 of the method 300 involves invoking the picking-up/entering of a passenger in the self-driving vehicle, and the prompting of the user to specify a link for the SDV controller to locate the passenger's calendar information, e.g., a link to the passenger's calendar application, e.g., Google Calendar. In an embodiment, the vehicle may communicatively couple with the passenger's calendar program by invoking the associated calendar API associated with that passenger's calendar program such that the SDV computer system 200 may obtain the passenger's current schedule information, or in the case of multiple passenger, obtain calendar information for one or more passengers. For example, accessed from the passenger's personal calendar may include information regarding a current event, e.g., a meeting that the passenger(s) is (are) to attend, at a place, e.g., a building and/or a specific floor/room number, and the time that the passenger(s) is(are) supposed to attend the event. Additionally, information accessed from the passenger's calendar may include a target destination where the passenger is to be driven to attend the event, for instance Madison Square Garden for a concert. In the case an event is a meeting to be attended by a variety of persons, additional information may be obtained such as names of the other invitees, attendees to the event.

In an embodiment, the passenger may enter the meeting time and destination location information via a touch-screen user interface provided at the SDV through, e.g., in response to a prompting by the SDV system.

In an alternate embodiment, the passenger's mobile device includes an application ("app") that can initiate communications with a car service who can dispatch an SDV to pick up the user at a requested time, or at an alternative time based on an initial traffic assessment of routes used to navigate the passenger to the desired destination at an estimated arrival time indicated by the passenger's calendar.

Based on the passenger's current location and given the scheduled time of the event to be attended, at 310, FIG. 3A, the SDV controller may implement a schedule information analyzer 270 that runs an algorithm that will use the passenger's current location and given scheduled event time to determine optimal arrival time (A) at the target destination, e.g., 5 minutes before the scheduled meeting. This determination may be made based on initial traffic condition assessment. For example, if the scheduled time for the meeting is at a time of day coinciding with known rush-hour traffic, there is initially determined a need for extra buffer time to ensure the passenger's timely arrival at the meeting. Additionally, current traffic and weather conditions can be taken into consideration. Further, the SDV controller may query a database associated with the building where the meeting is to take place to obtain additional contextual information associated with the building. For example, the SDV system controller is configurable to interrogate the building's Internet-of-Things (I-o-T) database to automatically obtain contextual information such as alerts, average elevator speed, average number of stops, etc. to better determine a time estimate required to dispatch the passenger from the curb at the building to the meeting room, so that the passenger will arrive to the scheduled meeting on time.

Further, at 315, using a well-known route planning algorithm run at the route planning module 285, the system 200 determines a navigation route for the SDV to travel take the passenger to the destination at the optimal arrival time (A). In an example implementation, at 310, a shortest-path algorithm (e.g., Dijkstra's Algorithm) is utilized to generate an initial route that the SDV may use to navigate the passenger to the scheduled event. The calendar information may further indicate the exact location, including room and floor of a building.

In an alternate embodiment, if an SDV is programmed to pick up a passenger arriving by plane at an airport based on a user's calendar information which indicates an arrival time, flight number and/or airlines of a passenger to be picked up, the SDV can prompt an air navigation application or database to obtain a current flight status of the en route plane carrying the passenger to the airport, and given current weather and/or traffic conditions, take action to ensure SDV arrival at the airport to pick up the passenger in a timely manner. For example, the SDV may program its route to ensure arrival at the airport to pick up the passenger without having to wait at the airport should there be encountered flight delays. Alternatively, the SDV may schedule itself to pick-up another passenger to take that another passenger to the same airline terminal if time permits. In another embodiment, the SDV can take into consideration average wait times for passengers to navigate through baggage claims and customs, on international flights, for passengers travelling on similar routes so that the SDV arrives when the arriving passenger is available to be picked up at the airport.

In a similar scenario, if the SDV is taking the passenger to the airport, then upon querying the air carrier's database to obtain a current flight status, it may be determined that there are flight take-off delays. Based on this context, the SDV may suggest that the passenger have a dinner somewhere before arrival at the airport and take that passenger to a near-by restaurant. If it is determined that the passenger is a tourist, in view of the flight status information indicating take-off delays, the SDV may automatically offer to take the passenger on a tour of the area if extra time permits, or alternatively, schedule itself to pick-up another passenger that can also be dropped off at the airport, or arrive at a later time to pick up the original passenger.

Having determined an estimated arrival time and a travel route/path at 315, the SDV at 320 proceeds to travel along the determined route to take passenger to the event.

Figure 5:
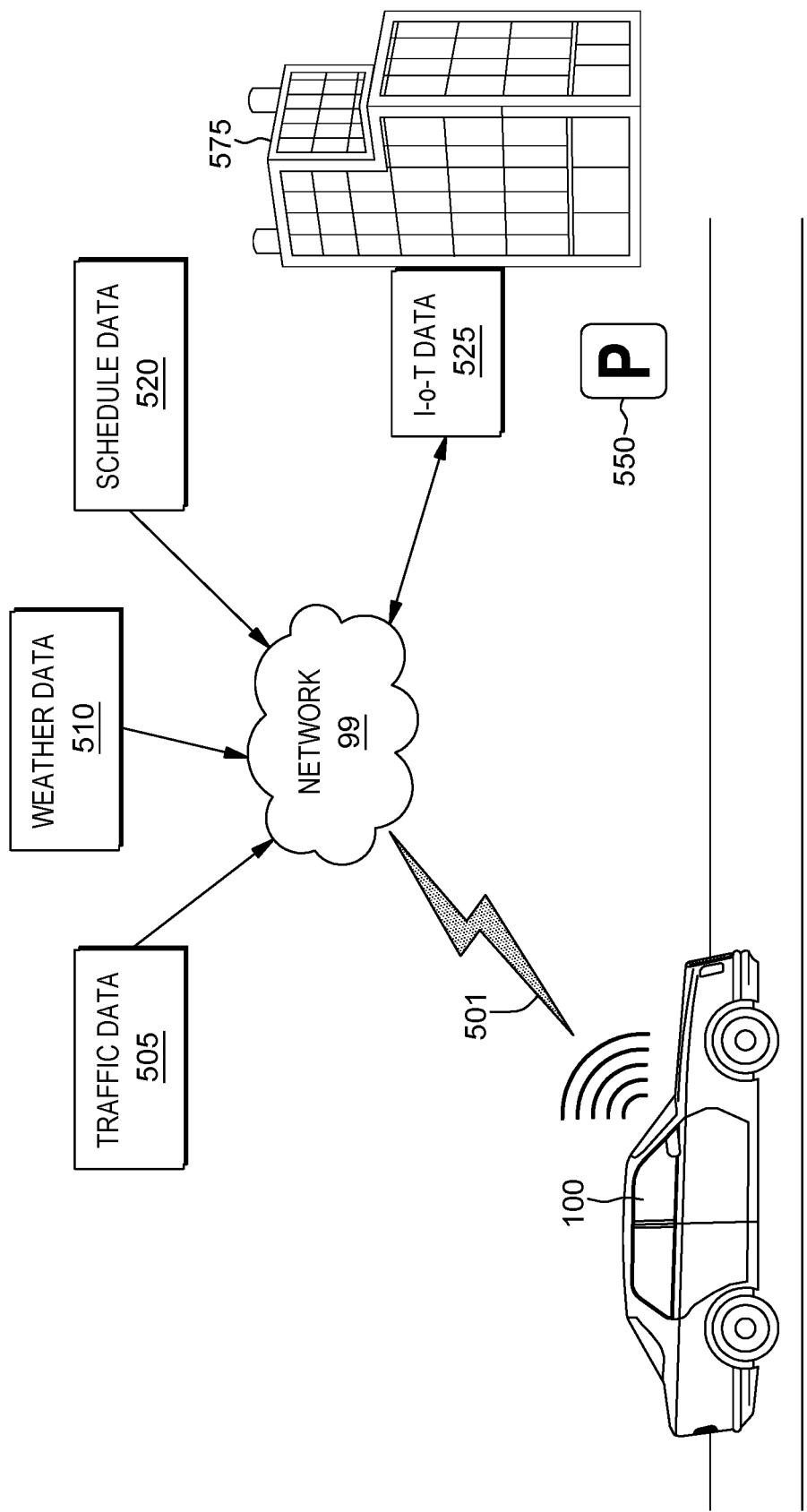
FIG. 5 depicts an example scenario for altering a SDV driving characteristic in accordance with embodiments of the present invention.

In an embodiment, as shown in FIG. 5 depicting an example scenario for altering an SDV driving characteristic, via wireless communications over a network 99, the SDV system of vehicle 100 receives inputs 501, including, for example, a data feed 505 concerning current traffic conditions, a data feed 510 indicating current weather conditions and a data feed 520 that includes the passenger's scheduling information, e.g., obtained from the passenger's calendar service. Additionally, the SDV system of vehicle 100 receives additional inputs 525 from the internet-of-things infrastructure associated with the meeting place to be attended by the passenger, e.g., a building 575, and its surrounding parking facilities 550.

Returning back to FIG. 3A, at 325, a determination is made as to whether the system receives any current traffic alerts and/or receives data concerning local traffic along the determined route the SDV is navigating. Alternatively, or in addition, at 325, a determination is made as to whether the system receives any current alert or information concerning the target destination location of the SDV that will impact the ability of the SDV 100 to park at or near the event or impact the ability to be drop off the passenger at the target destination and time. For example, based on querying the I-o-T infrastructure at the meeting event destination, e.g., building 575 shown in FIG. 5, I-o-T data 525 may be received from which the SDV system may be determined, for example, that the elevators at the building at the destination are crowded, that there is a fire in the building, or that only one elevator is able to take passengers to a destination location (e.g., $14^{th}$ floor) of the building at which the meeting takes place, all current scenarios which would impact the ability of the passenger to arrive at the meeting and would prompt the SDV navigation system to modify the departure time to ensure arriving at the scheduled time. As a further example, the I-o-T infrastructure at the meeting location may employ parking meters, which can be analyzed to detect current availability of parking at a passenger drop-off location, or implement some camera-based scan analysis of available parking at the drop-off location, or based on a model of given traffic levels and time of day to determine potential parking availability which information may be accessed/used ahead of time to modify the vehicle behavior to anticipate a new passenger drop off location, e.g., given indication of a lack of available parking. As an example, if the drop off location at an airport terminal is congested, the SDV may alter its speed so that it arrives when a safe drop off location is available.

If at 325, FIG. 3A, it is determined that no traffic/parking alerts have been received, the process proceeds to step 350, FIG. 3A. However, if a traffic condition/alert is received at 325 or if it is determined by I-o-T processing infrastructure that there are issues at the destination which impact the passengers arrival time at the event, the route planner algorithm is run at 330 to determine the impact of the traffic or other sensed conditions, and a determination is made at step 335 whether due to the reported traffic or other condition, the SDV and passenger's expected destination arrival time is impacted, e.g., delayed. If it is determined at 335 that the passenger's expected destination arrival time is not impacted by the current traffic conditions, then the process proceeds to step 350 where the method determines a current cognitive state of the user using the cognitive state detector module 275. Otherwise, if it is determined at 335 that the passenger's expected destination arrival time is impacted based on the traffic alerts, then the process proceeds to step 340 where the route planner estimates a passenger discharge time window of uncertainty (D). Then the process proceeds to 350, FIG. 3A to determine the passenger's cognitive and/or behavioral state. For example, in an embodiment, a passenger's cognitive state can be estimated as being tired, in which case it would be beneficial to the passenger to arrive a little earlier to help the passenger orient to the new setting, find coffee, take a break and splash water on the passenger's face, and/or provide a few extra minutes time for grooming or drying off, e.g., from rain, etc. In an embodiment, the SDV via a passenger interface, may tell the passenger "Let me give you 10 extra minutes. Close your eyes and relax" when the passenger state is detected as being tired. The system additionally takes into various ambient considerations: parking, weather, road conditions, nearness of drop-off location to meeting, and whether the passenger has an umbrella, etc.

At step 350, FIG. 3A, the system 200 runs the cognitive state detector module 275 to invoke sensors and/or a video camera to monitor the current state of the passenger within the SDV. For example, based on received sensor data, the cognitive state detector module 275 may determine that the user is sleepy or very tired or is reading a book or is having a distressing conversation on a mobile phone and is agitated. In an example scenario where the event indicated by the passenger's calendar is a meeting to be attended by the passenger, cognitive state detector module 275 and associated sensors can detect that the passenger is reading a memo, a book, or notes in preparation of the meeting or event. Alternatively, or in addition, the prior history of the passenger's cognitive state can be taken into account at this step. For example, a prior history of the passenger when attending other events or similar events (e.g., a history of reading in the vehicle, falling asleep in the vehicle, or being nervous about being late for a meeting or in missing a flight), can be taken into when modifying SDV behavior In a further example scenario, an infrared sensor located in the SDV may be used to ascertain that the passenger is perspiring, as measured by reflectance of the passenger's sweat upon his/her skin using an infrared (IR) camera sensor, in which case the SDV will determine that the passenger may be having a panic attack, is nervous, or is distressed about the meeting. In response to such determination, the SDV may automatically offer to delay arrival time at the estimated arrival time/destination so that the passenger has additional time to collect his/her self and regain composure. Additionally, using an IoT sensor, a heart rate of the passenger is detectable, or, using a camera, a state of the passenger's eyes (e.g., eyes opened or closed) is detectable, and this passenger context information may be used by the SDV to suggest altering the path to delay arrival based on the passenger's current state.

Proceeding to step 355, FIG. 3B, based on the detected cognitive/behavioral state of the passenger, the system 200 runs the analytics model at the cognitive state detector module 275 to determine any impact, e.g., delay, caused by the passenger's current cognitive/behavioral state. At 360, a determination is made as to whether, based on the detected cognitive/behavioral state of the passenger, the passenger's expected destination arrival time is to be impacted. For example, if a passenger's cognitive state is detected based on one or more of: a detection of the passenger perspiring or being nervous or distressed; a detection of the passenger engaging in a heated phone conversation; a determination that the SDV passenger is reading a document related to the forthcoming meeting/event; or a determination of the SDV passenger's tiredness based on that passenger's eyes being detected as closed, the SDV module may determine that the passenger needs extra time to prepare for the meeting which would impact the passenger's expected destination arrival time. In an embodiment, via a user interface at the SDV, the SDV may suggest that the travel route be delayed or extended to delay the arrival time or request that the user agree to changes or deviations of the driving parameters in order for the passenger to be better ready for the meeting. Alternatively, the SDV may arrive earlier than scheduled to alleviate the passenger's worries about being late. The SDV system 200 can then receive user input that authorizes or agrees to the delaying of the arrival time by the SDV for better preparedness of the passenger, such as by agreeing to changes in driving parameters, e.g., speed, route. For example, the SDV may sense that the passenger is really engaged with the book being read and may suggest or offer to the passenger that the arrival time be delayed for the passenger to finish reading the current chapter, finish the current phone call, or just relax before entering the meeting. Alternatively, the SDV system automatically alters the travel route or adjusts it speed, to extend the travel/arrival time for the passenger to arrive at the event in order that the passenger can get better prepared and/or regain composure.

In an alternate embodiment, it is determinable from the passenger's calendar that the meeting which the passenger is to attend includes a nominal starting time and an actual starting time. For example, based on a history of similar meetings, it may be learned that the principle or leader of the meeting may always be 15 minutes late in which case the meeting actually starts 15 minutes later than the scheduled start time which information may be used to alter or delay the passenger's arrival so that the passenger arrives at the actual starting time.

If it is determined at 360, FIG. 3B that the passenger's expected destination arrival time is not impacted, then the process can return to 320, FIG. 3A where the SDV continues navigating along the determined route to the target destination. Otherwise, if it is determined at 360, FIG. 3B that the passenger's expected destination arrival time is impacted, then the process proceeds to 365, FIG. 3B to determine an estimated time (N) representing a total future drive time need for that passenger based on the passenger's detected cognitive/behavioral state. For example, the estimated passenger total future drive time needs (N) may be a value indicating a time that passenger must finish reading his/her notes or complete a phone call with another attendee prior to the meeting. In another scenario, it may be detected that the passenger is tired and may benefit from extra time to get a cup of coffee or that the passenger is putting on make-up and can benefit from extra time to spruce up her appearance or to groom and regain their composure in anticipation of the event which would impact the drive time. These determinations of passenger activities are based on analytics run at the SDV, and the SDV may suggest for approval by the passenger any alteration or modification of SDV speed or route.

The process then proceeds to 370 where the combination of the route planner and vehicle speed controller will run a navigation path algorithm to either alter the SDV speed and/or route given the constraints, e.g., impact of the traffic conditions and/or the passenger's detected cognitive or behavioral state. In an embodiment, given a current time (T), and based on the determined estimated passenger total future drive time needs (N) and passenger discharge time window of uncertainty (D), a SDV speed and route may be altered such that the parameters T, N, D, A satisfy the relation according to equation 1) as follows:

$$A=T+(N+/-D) \quad 1)$$

In an embodiment, a time constrained routing and scheduling algorithm (using time window constraints) or any method that can provides a constraints based optimization of route and arrival time can be used to alter the SDV speed and/or route.

Upon determining to alter the SDV route and/or speed at step 370, the process can prompt the passenger with the proposed parameter changes, e.g., altered SDV speed, or route, and request that the user accept the proposed modified route/speed and or arrival time. Once the passenger accepts the changed parameters, the SDV is updated and the method can return to 320, FIG. 3A where the SDV continues navigating along the determined route to the target destination and repeat cognitive state detection. In an embodiment, the SDV's speed and route is modified based on the estimated arrival time.

Figure 4:
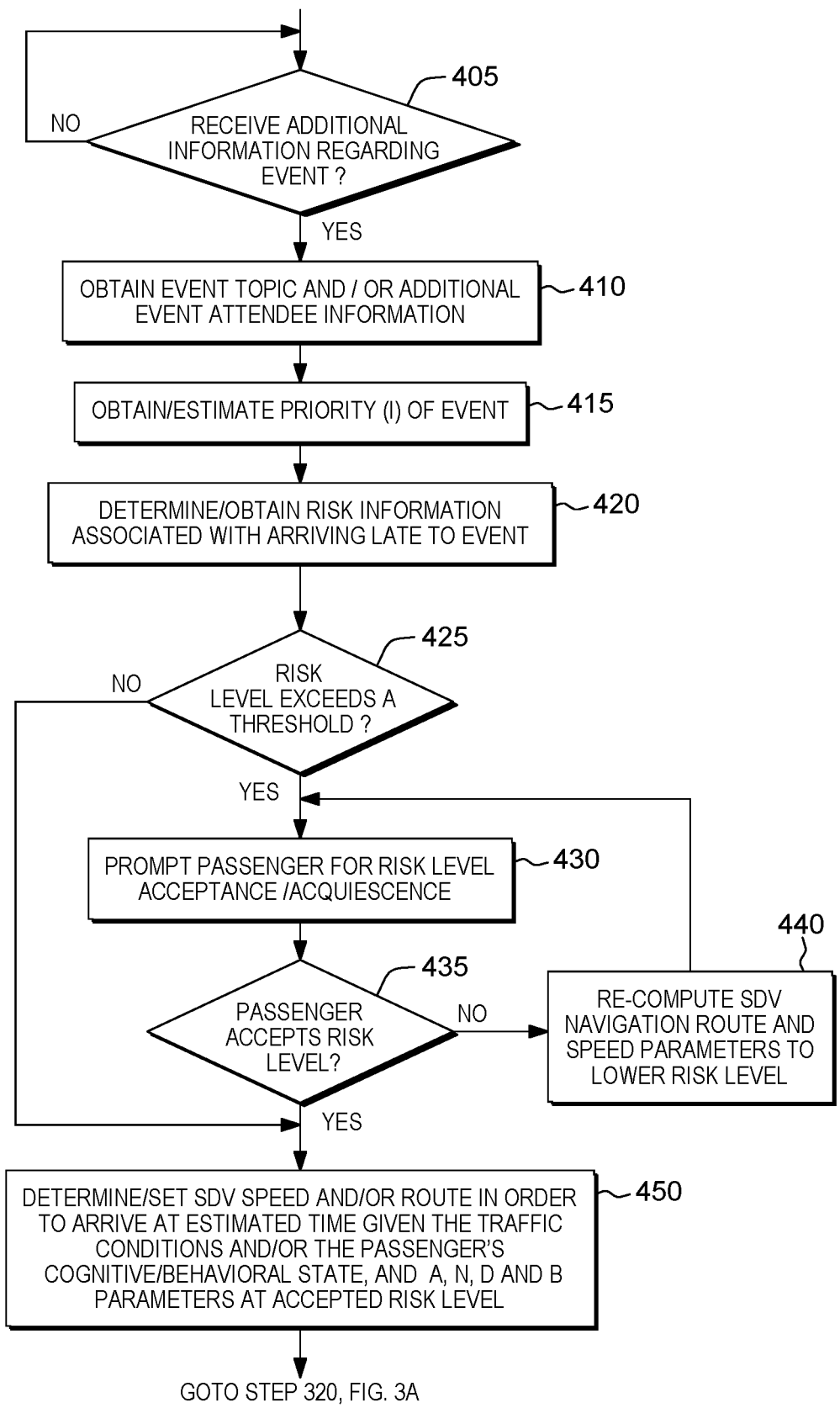
FIG. 4 depicts an example block diagram of further method steps implemented for modifying driving characteristics of the SDV based on additional consideration.

FIG. 4 depicts, in more detail, additional processing steps 400 invoked for modifying SDV navigation route and/or speed that takes into account additional considerations of the passenger's cognitive/behavioral state and/or cognitive and/or behavioral state of other attendees at the scheduled event/meeting. In an embodiment, the processing method at 405, FIG. 4, determines the acquiring of additional information from the passenger's calendar.

For example, based on the electronic calendar information received at 405, FIG. 4, a type of event or topic may be determined. In an embodiment, the detected event is a meeting that the passenger is to attend. In accordance with the passenger's calendar program, additional information gathered from the passenger's calendar at 405 may include information on the meeting topic, and/or other attendees/invitees of the meeting as shown by 410. From such information, at 415, FIG. 4, the system 200 of FIG. 2 may invoke operations of the priority determiner module 272 to automatically estimate an importance or priority (I) of such meeting based on the topic or participation of particular other attendees and determine an optimal arrival time that is appropriate. In an embodiment, at 415, besides estimating an importance of such a meeting automatically, the meeting importance or priority may be indicated by the passenger via an interface of the SDV, indicated in the passenger's calendar entry, or in the passenger's social network, or calendar entries of other meeting attendees (or their social media entries), etc. For example, a meeting attendee or organizer may optionally specify a parameter (e.g. in a calendar invite) that is different for different attendees, and this may affect the desired arrival time and buffer times for a passenger in an SDV. Denoting event importance as "I", the aforementioned equation 1) is modified according to equation 2) so that in addition to the parameters A, T, N and D parameters, can insert more of a time "buffer" or time safety margin parameter "B", e.g., to form equation 2) as a modified equation 1) as follows:

$$A=T+(N+/-D)+B \quad 2)$$

where B is the extra buffer time which is used by the SDV to ensure a passenger arrives on time, or even a little early, which may be beneficial given the determined importance "I" of the meeting. For example, by knowing that the passenger's employer or team leader is going to the meeting will increase a priority, i.e., increase the I value, and correspondingly, the buffer time "B" such that user can timely attend with proper composure. Alternatively, the importance I might be extremely high if a passenger is the keynote speaker at a conference where being late would act every conference attendee.

In one embodiment, the SDV can "learn" about the typical lateness of a scheduled calendar appointment and adjust the arrival time accordingly. As an example, if a meeting is scheduled for 10:00 AM, and it is known generally from calendar or social media entries that the team "leader" is always 10 minutes late to the meeting, then the SDV can be programmed to transport the passenger to arrive at the expected starting time (i.e., 10 minutes later), rather than the nominal indicated starting time.

In an embodiment, there is "risk management" element involved. For example, continuing at 420, FIG. 4, the SDV system additionally determines an associated risk level, e.g., indicating a risk in arriving late for the meeting, or accordingly receive such risk level information from a risk management engine (not shown). Then, at 425, a determination is made as to whether the passenger's risk level pertaining to the current event exceeds a threshold risk level, which would result in altering SDV parameters such that the risk of arriving late to the meeting is minimized.

In an embodiment, a risk level of the passenger is determined based on a learning of passengers' satisfaction level. For example, the system may present a follow-up survey for passengers to rate their experience riding in the SDV and receive feedback as to a passenger's experience in the SDV. Based on multiple users' feedback, the system can determine a risk associated with arriving late at the destination for future passengers. For example, if a passenger's satisfaction level is low after being dropped off early at a destination during a rainstorm, and many other passengers have similar experiences (during a rainstorm) indicating a low satisfaction level, this feedback provided can be used for the system to learn and in the future, will implement a learned logic associated with not discharging passengers into a rainstorm when the SDV is programmed to stop. Even without a passenger providing feedback, the system can learn a logic of a different user context that does result in a satisfactory passenger experience as compared to a passenger context resulting in dissatisfaction.

In another example, if an SDV is picking up several passengers at different hotels all en route for drop off at the airport, the one or more of passengers who was picked up earliest may exhibit nervousness indicating a concern that they will be arriving late and miss a flight. The passenger may then do something different next time they are in a similar situation to avoid the risk of getting to the airport late and missing the flight. Then the SDV system will learn based on this behavior and take steps to avoid missing flight for similarly situated future passengers.

Thus, based on the wisdom of the crowds, a history of similar journeys, and passenger cohorts (learning a passenger category or a passenger "type"), the system can use feedback for learning passenger behaviors for use in modifying driving characteristics. For example, the SDV will be adapted to satisfy its "mission" objectives and the time constraints of the mission.

If, at 425, FIG. 4, the passenger's current risk level pertaining to arriving late at the current event is determined does not exceed the passenger's threshold risk level, then the process continues to 450 where the combination of the route planner and vehicle speed controller will run a navigation path algorithm to either alter the SDV speed and/or route given the impact of the traffic conditions and/or the passenger's detected cognitive or behavioral state and meeting importance. In an embodiment, given a current time (T), and based on the determined estimated passenger total future drive time needs (N) including a built-in buffer time I, a SDV speed and route may be altered such that the parameters T, N, D, A and B satisfy the relation according to equation 2).

Alternatively, if there is a passenger risk determined at 425, FIG. 4 that exceeds even a slight threshold risk level in arriving late, even based on histories of a meeting, the system at 430 can prompt the passenger for his or her approval or acquiescence to accept the risk. A determination is made at 435, FIG. 4, if the passenger will accept the determined risk level. If, at 435, it is determined that the passenger accepts the determined risk level, then at 450, FIG. 4, the SDV determines using the navigation path analytics a modified route and/or speed based on the estimated time of arrival at the destination given the traffic conditions and/or the passenger's cognitive/behavioral state, and the computed A, N, D and B parameters.

Otherwise, at 435, if the user does not accept the risk level based on the risk information of arriving late to the event or meeting, the system at 440 may re-compute an SDV navigation route and speed parameters intended to lower the passenger's risk level and return to 430 to prompt the passenger whether the passenger is able to accept the reduced level of risk. If the passenger accepts the risk level at 435, then the process proceeds to 450 to set the speed and/or route in order to arrive at the estimated time given the traffic conditions, passenger cognitive state, and the computed A, N, D and B parameters associated with the accepted late arrival risk level for the passenger. Only until a late arrival risk level for the passenger is acceptable, will the process steps 420-440 repeat. Once the SDV speed and/or route is set to arrive at estimated time given the traffic conditions and/or the passenger's cognitive/behavioral state, and A, N, D and B parameters at the accepted passenger risk level, the process will return to step 320, FIG. 3A in order to navigate and listen for any changes in traffic/weather conditions and/or changes in passenger's cognitive behavior.

In one embodiment, the user risk level processing of FIG. 4 may receive as input or access a user/passenger profile that specifies the degree of risk he or she is generally willing to take.

In a further embodiment, with no pre-specified user profile, risk level processing of FIG. 4, system 200 may conduct or perform a cognitive assessment (estimation) to estimate, at least with some level of confidence, the characteristics of the passenger with respect to risk. For example, considering an example scenario where a passenger is detected as sleeping in the SDV and the risk of being late is extremely low, the SDV may be more leisurely in bringing the passenger to a destination or scheduled appointment.

In another embodiment, as the anticipated departure time of airplane flights is available in real-time, online, the SDV could use this information to delay the pickup of a passenger to avoid him/her having to wait at the airport. Alternatively, the SDV could use the arrival time information to delay or speed up to get to the airport on time to pickup a traveler.

In a further embodiment, the cognitive state of one or more passengers could be used to tailor the drop off time at the airport. For example, some passengers are nervous about missing planes due to long lines at the security checkpoints. Using a feed (e.g. video, or modified video to reduce security or privacy concerns) from the Transportation Security Administration (TSA) checkpoints, the system provides feedback to the SDV, and with the cognitive state of the passenger, be used to estimate the pickup time for the passengers to drive them to the airport.

Figure 6:
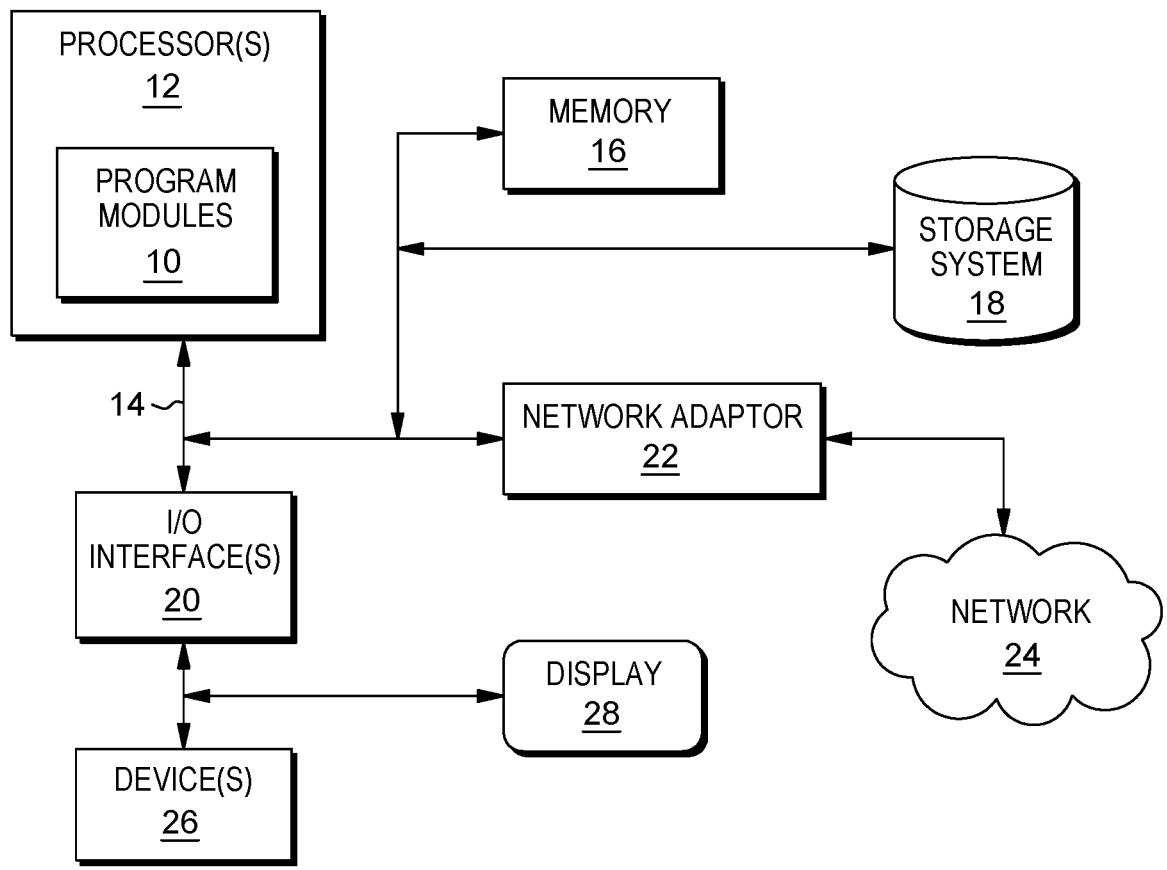
FIG. 6 depicts an exemplary system in accordance with embodiments of the present invention.

FIG. 6 illustrates an example computing system in accordance with the present invention that may provide the services and functions associated with altering self-driving vehicle behavior based on passengers scheduling information and cognitive state. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 3A-3B and FIG. 4.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In one embodiment, a computing system, environment, and/or configuration that may be suitable for use with the system shown in FIG. 1 include a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
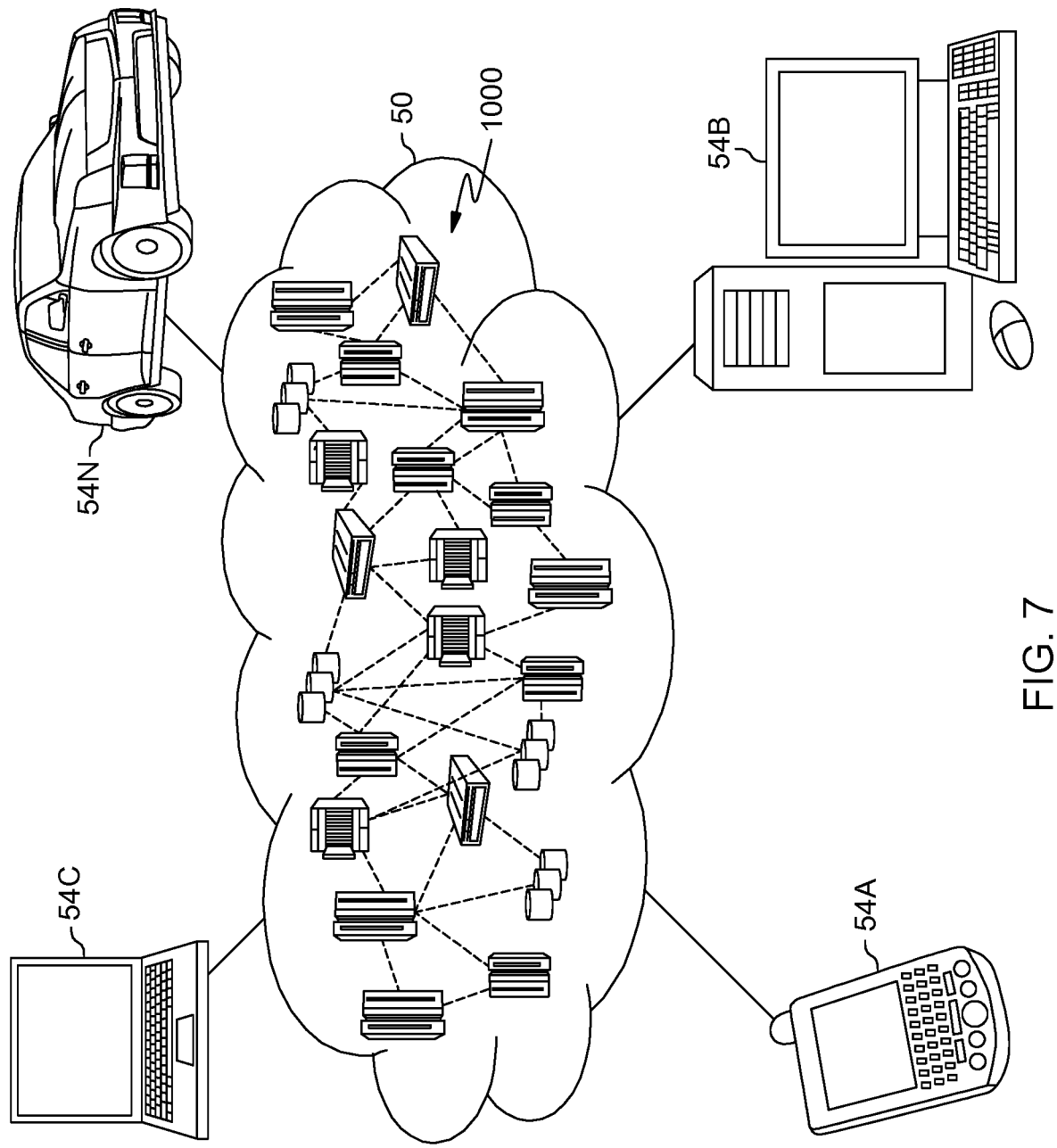
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 1000 with which local computing devices used by cloud consumers, such as, for example, personal digital assistant (PDA) or cellular telephone 54A, desktop computer 54B, laptop computer 54C, and/or the SDV computer system 54N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 1000 and cloud computing environment 50 can communicate with any type of computerized device over any type of network and/or network addressable connection (e.g., using a web browser).

Figure 8:
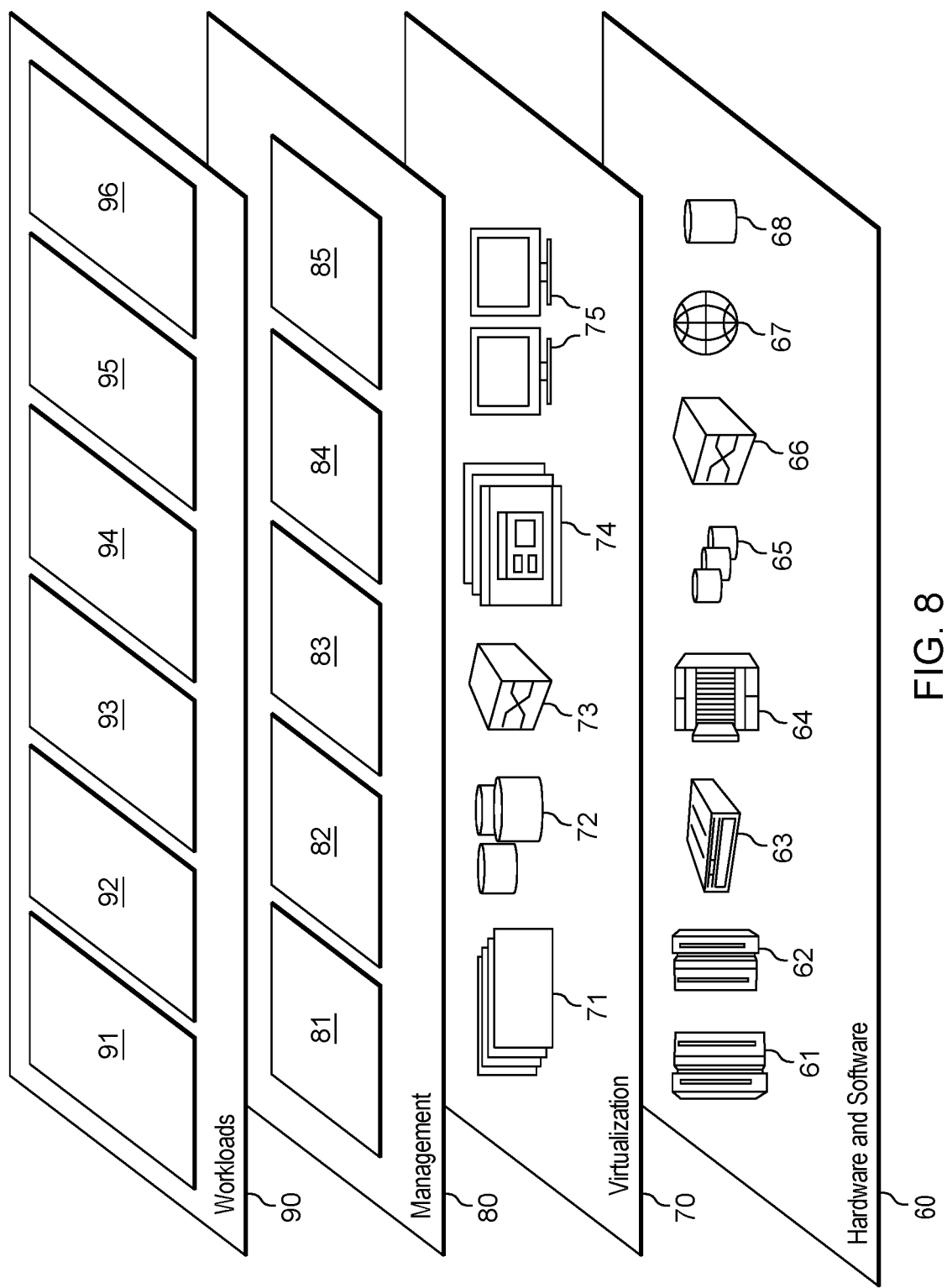
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the self-driving vehicle modifying processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for operating a self-driving vehicle (SDV) comprising:
   receiving, at a processor of a computer system at said SDV, information from a calendar entry of a passenger's schedule;
   detecting, using one or more sensors, one or more behaviors of said passenger in said SDV, the passenger's behavior comprising a cognitive state of said passenger;
   estimating, using the processor, a travel time for said SDV and passenger to arrive at a destination location associated with said calendar information;
   running, using the processor, an analytics model to determine an estimated total additional future drive time need based on the passenger's detected cognitive state;
   determining, using the processor, an optimal arrival time to the destination location based on the passenger's schedule information and the passenger's behavior, said optimal arrival time determined as a function of a current time, the estimated total additional future drive time need based on the passenger's detected cognitive state, and a passenger discharge time window of uncertainty determined in response to a vehicle parking condition detected at the destination location; and
   altering, using the processor, a driving characteristic of the SDV based on the determined optimal arrival time and the estimated travel time.

2. The computer-implemented method of claim 1, wherein the passenger's calendar entry information comprises at least one of an event time, an event topic, an event attendee, a degree of importance of an event.

3. The computer-implemented method of claim 2, wherein the event comprises at least one of a meeting, a conference, an appointment, or an airplane flight.

4. The computer-implemented method of claim 1, wherein said detecting passenger behaviors comprise: using said one or more sensors to detect one or more of: talking on a phone, reading materials related to a forthcoming event, being in a tired state, being in a sleeping state, being agitated or nervous, being in a perspiring state, watching a movie, eating a meal, or a behavioral state based on a prior history of the passenger.

5. The computer-implemented method of claim 1, wherein the altering driving characteristics comprises:
   altering one or more of: a speed of the vehicle or a route taken by the vehicle or a time at which to pickup the passenger at an initial location, the pickup time based on said estimated travel time for said SDV and passenger to arrive at the destination location.

6. The computer-implemented method of claim 1, further comprising:
   receiving, at said processor, one or more of:
   a traffic condition signal based on a detected current or forecast traffic condition along a route said SDV traverses;
   a parking condition signal based on the detected current vehicle parking condition near the destination location or passenger drop-off point; or
   a weather condition signal based on a detected current or forecast weather condition near the destination location, wherein the optimal arrival time is determined further based on one or more of said traffic condition, parking condition or weather condition alerts.

7. The computer-implemented method of claim 1, further comprising:
   determining a degree of risk of not getting the passenger to the destination location on time, and
   altering a driving characteristic of the SDV based on the determined degree of passenger risk.

8. A computer-implemented system for operating a self-driving vehicle (SDV) comprising:
   one or more sensors for monitoring a behavior of a passenger in said SDV;
   a computer readable storage memory having instructions stored thereon that, when executed by
   a hardware processor of a computer system at said SDV, cause the computer system to perform a method to:
   receive information from a calendar entry of a passenger's schedule;
   detect from said one or more sensors, one or more behaviors of said passenger in said SDV, the passenger's behavior comprising a cognitive state of said passenger;
   estimate a travel time for said SDV and passenger to arrive at a destination location associated with said calendar information;
   run an analytics model to determine an estimated total additional future drive time need based on the passenger's detected cognitive state;
   determine an optimal arrival time to the destination location based on the passenger's schedule information and the passenger's behavior, said optimal arrival time determined as a function of a current time, the estimated total additional future drive time need based on the passenger's detected cognitive state, and a passenger discharge time window of uncertainty determined in response to a vehicle parking condition detected at the destination location; and
   alter a driving characteristic of the SDV based on the determined optimal arrival time and the estimated travel time.

9. The computer-implemented system of claim 8, wherein the passenger's calendar entry information comprises at least one of an event time, an event topic, an event attendee, a degree of importance of an event.

10. The computer-implemented system of claim 9, wherein the event comprises at least one of a meeting, a conference, an appointment, or an airplane flight.

11. The computer-implemented system of claim 9, wherein the detected passenger behavior comprises one or more of: talking on a phone, reading materials related to a forthcoming event, being in a tired state, being in a sleeping state, being agitated or nervous, being in a perspiring state, watching a movie, eating a meal, or a behavioral state based on a prior history of the passenger.

12. The computer-implemented system of claim 8, wherein the altering driving characteristics comprises:
   altering one or more of: a speed of the vehicle or a route taken by the vehicle or a time at which to pickup the passenger at an initial location, the pickup time based on said estimated travel time for said SDV and passenger to arrive at the destination location.

13. The computer-implemented system of claim 8, wherein said processor is further configured to:

receive one or more of:
- a traffic condition signal based on a detected current or forecast traffic condition along a route said SDV traverses;
- a parking condition signal based on the detected current vehicle parking condition near the destination location or passenger drop-off point; or
- a weather condition signal based on a detected current or forecast weather condition near the destination location, wherein the optimal arrival time is determined further based on one or more of said traffic condition, parking condition or weather condition alerts.

14. The computer-implemented system of claim 8, further comprising:
- determining a degree of risk of not getting the passenger to the destination location on time, and
- altering a driving characteristic of the SDV based on the determined degree of passenger risk.

15. A computer program product comprising a non-transitory, computer-readable readable medium comprising instructions that, when executed by at least one processor comprising hardware, configure the at least one processor to operate a self-driving vehicle (SDV), said processor being configured to:
- receive information from a calendar entry of a passenger's schedule;
- detect from one or more sensors, one or more behaviors of said passenger in said SDV, the passenger's behavior comprising a cognitive state of said passenger;
- estimate a travel time for said SDV and passenger to arrive at a destination location associated with said calendar information;
- run an analytics model to determine an estimated total additional future drive time need based on the passenger's detected cognitive state;
- determine an optimal arrival time to the destination location based on the passenger's schedule information and the passenger's behavior, said optimal arrival time determined as a function of a current time, the estimated total additional future drive time need based on the passenger's detected cognitive state, and a passenger discharge time window of uncertainty determined in response to a vehicle parking condition detected at the destination location; and
- alter a driving characteristic of the SDV based on the determined optimal arrival time and the estimated travel time.

16. The computer program product of claim 15, wherein the passenger's calendar entry information comprises at least one of an event time, an event topic, an event attendee, a degree of importance of an event.

17. The computer program product of claim 16, wherein the event comprises at least one of a meeting, a conference, an appointment, or an airplane flight.

18. The computer program product of claim 16, wherein the detected passenger behavior comprises one or more of: talking on a phone, reading materials related to a forthcoming event, being in a tired state, being in a sleeping state, being agitated or nervous, being in a perspiring state, watching a movie, eating a meal, or a behavioral state based on a prior history of the passenger.

19. The computer program product of claim 15, wherein the altering driving characteristics comprises:
- altering one or more of: a speed of the vehicle or a route taken by the vehicle or a time at which to pickup up the passenger at an initial location, the pickup time based on said estimated travel time for said SDV and passenger to arrive at the destination location.

20. The computer program product of claim 15, wherein said instructions further configure said processor to:
receive one or more of:
- a traffic condition signal based on a detected current or forecast traffic condition along a route said SDV traverses;
- a parking condition signal based on the detected current vehicle parking condition near the destination location or passenger drop-off point; or
- a weather condition signal based on a detected current or forecast weather condition near the destination location, wherein the optimal arrival time is determined further based on one or more of said traffic condition, parking condition or weather condition alerts.

* * * * *